US012432489B2

(12) United States Patent
Chang et al.

(10) Patent No.: US 12,432,489 B2
(45) Date of Patent: Sep. 30, 2025

(54) SPEAKER MODULE

(71) Applicant: Acer Incorporated, New Taipei (TW)

(72) Inventors: Jia-Ren Chang, New Taipei (TW); Ruey-Ching Shyu, New Taipei (TW); Chien-Chung Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 252 days.

(21) Appl. No.: 18/311,406

(22) Filed: May 3, 2023

(65) Prior Publication Data

US 2024/0214720 A1 Jun. 27, 2024

(30) Foreign Application Priority Data

Dec. 21, 2022 (TW) ................................. 111149111

(51) Int. Cl.
*H04R 1/28* (2006.01)
*H04R 1/02* (2006.01)
(Continued)

(52) U.S. Cl.
CPC .......... *H04R 1/2873* (2013.01); *H04R 1/025* (2013.01); *H04R 3/08* (2013.01); *H04R 7/12* (2013.01); *H04R 9/06* (2013.01); *H04R 1/028* (2013.01); *H04R 2400/11* (2013.01); *H04R 2499/15* (2013.01)

(58) Field of Classification Search
CPC ........ H04R 1/2873; H04R 1/025; H04R 3/08; H04R 7/12; H04R 9/06; H04R 1/028; H04R 2400/11; H04R 2499/15
See application file for complete search history.

(56) References Cited

U.S. PATENT DOCUMENTS 4,454,927 A * 6/1984 Seebinger .............. H04R 1/021
181/150
4,583,245 A * 4/1986 Gelow ..................... H04R 3/14
381/100

(Continued)

FOREIGN PATENT DOCUMENTS

CN 104486697 B * 1/2019 ............. H04R 1/025
GB 2549078 A * 10/2017 ............... H04R 1/02

(Continued)

OTHER PUBLICATIONS

EP Search Report dated Nov. 20, 2023 in EP application No. 23175637.0-1210.

*Primary Examiner* — Oyesola C Ojo
(74) *Attorney, Agent, or Firm* — McClure, Qualey & Rodack, LLP

(57) ABSTRACT

A speaker module includes a casing, a speaker unit and a first vibration absorber. The speaker unit has a sound cavity. The speaker unit is disposed on a first wall of the casing. The speaker unit includes a diaphragm, a coil and a magnet, and the coil is configured to drive the diaphragm to vibrate relative to the magnet. The first vibration absorber is disposed in the sound cavity, and the first vibration absorber has a first natural frequency. When the ratio of the frequency of the diaphragm to the first natural frequency is greater than 0.781 and less than 1.28, the first vibration absorber is configured to absorb the vibration generated by the diaphragm to the casing.

18 Claims, 12 Drawing Sheets

(51) Int. Cl.

| | |
|---|---|
| ***H04R 3/08*** | (2006.01) |
| ***H04R 7/12*** | (2006.01) |
| ***H04R 9/06*** | (2006.01) |

(56) References Cited

U.S. PATENT DOCUMENTS

| | | | | |
|---|---|---|---|---|
| 5,577,126 | A * | 11/1996 | Klippel | H04R 3/08<br>381/59 |
| 10,382,858 | B1 * | 8/2019 | Singer | H04R 1/40 |
| 2005/0089184 | A1 * | 4/2005 | Wang | H04R 1/288<br>381/345 |
| 2012/0033837 | A1 * | 2/2012 | Mitsui | H04R 1/005<br>381/191 |
| 2012/0250928 | A1 * | 10/2012 | Pance | H04R 9/066<br>381/396 |
| 2013/0308798 | A1 * | 11/2013 | Lee | H04R 9/02<br>381/151 |
| 2016/0192076 | A1 * | 6/2016 | Noertker | H04R 9/045<br>381/370 |
| 2019/0098121 | A1 * | 3/2019 | Jeon | H04M 1/026 |
| 2019/0149910 | A1 * | 5/2019 | Lee | G10K 11/002<br>381/386 |
| 2020/0097244 | A1 * | 3/2020 | Kim | H04R 1/24 |
| 2020/0359118 | A1 * | 11/2020 | Sato | H04R 1/323 |
| 2022/0337689 | A1 * | 10/2022 | Li | H04M 1/18 |
| 2024/0305924 | A1 * | 9/2024 | Matsunaga | H04R 1/025 |
| 2024/0357283 | A1 * | 10/2024 | Yoshida | B60R 11/0217 |

FOREIGN PATENT DOCUMENTS

| | | | | | |
|---|---|---|---|---|---|
| JP | 35370227 | U | | 6/1978 | |
| JP | 11341585 | | | 12/1999 | |
| JP | 11341586 | | | 12/1999 | |
| JP | 11341595 | | | 12/1999 | |
| JP | 2000013884 | | | 1/2000 | |
| JP | 2000013887 | | | 1/2000 | |
| JP | 2000013887 | A | * | 1/2000 | |
| JP | 2004312471 | A | * | 11/2004 | H04R 1/02 |
| JP | 3600983 | B2 | * | 12/2004 | H04R 7/18 |
| JP | 2005012568 | A | * | 1/2005 | H04R 1/28 |
| JP | 4482291 | B2 | * | 6/2010 | H04R 1/28 |

* cited by examiner

100C

SPEAKER MODULE

CROSS REFERENCE TO RELATED APPLICATIONS

This application claims the benefit of Taiwan Patent Application No. 111149111, filed Dec. 21, 2022, the entirety of which are incorporated by reference herein.

BACKGROUND OF THE INVENTION

Field of the Disclosure

The present disclosure relates to a speaker module, and in particular it relates to a speaker module capable of reducing vibration displacement.

Description of the Related Art

As technology has developed, many of today's electronic devices (such as notebook computers) are quite popular products nowadays. These notebook computers are the most popular and widespread of today's consumer products. Users can execute various applications on notebook computers to achieve various purposes, such as watching videos, playing games, browsing the web, and reading e-books.

Generally speaking, electronic devices such as notebook computers are equipped with at least one speaker module configured to provide sound, including music. However, existing speaker modules generate unnecessary vibrations when emitting sound, causing the notebook computer to emit noise. Especially when low-frequency sound effects are emitted, the vibration generated by the speaker module will be particularly obvious, seriously affecting the user experience.

Therefore, how to design a speaker module that can reduce the low-frequency vibration is a topic nowadays that needs to be discussed.

BRIEF SUMMARY OF THE INVENTION

Accordingly, one objective of the present disclosure is to provide a speaker module to solve the above problems.

The present disclosure provides a casing, a speaker unit and a first vibration absorber. The speaker unit has a sound cavity. The speaker unit is disposed on a first wall of the casing. The speaker unit includes a diaphragm, a coil and a magnet, and the coil is configured to drive the diaphragm to vibrate relative to the magnet. The first vibration absorber is disposed in the sound cavity, and the first vibration absorber has a first natural frequency. When the ratio of the frequency of the diaphragm to the first natural frequency is greater than 0.781 and less than 1.28, the first vibration absorber is configured to absorb the vibration generated by the diaphragm to the casing.

According to some embodiments, the first vibration absorber is connected to the center of the bottom of the magnet. The first vibration absorber has a first block body and a first spring. The first spring is connected between the first block body and the magnet.

According to some embodiments, the first vibration absorber further has a first damping element connected between the first block body and the magnet, and the first damping element and the first spring are integrally formed as one piece.

According to some embodiments, the casing forms a protective wall which extends from a second wall of the casing toward the first wall, and the protective wall is configured to surround and protect the first vibration absorber.

According to some embodiments, the casing is made of plastic material, and the protective wall and the second wall are integrally formed as one piece.

According to some embodiments, the protective wall has a tubular structure, and a buffering member is disposed on the inner surface of the protective wall and surrounds the first vibration absorber.

According to some embodiments, the buffering member is made of a rubber material.

According to some embodiments, the protective wall has a first height in a first direction, the first block body has a maximum distance from the second wall in the first direction, and the first height is greater than the maximum distance, wherein the first direction is perpendicular to the second wall.

According to some embodiments, the first block body is made of iron or copper, and the first mass of the first block body is less than 2 grams and is in accordance with the following relational expression:

$$f = \frac{1}{2\pi}\sqrt{\frac{k_a}{m_a}},$$

wherein f is the frequency when the diaphragm vibrates, $k_a$ is the first elastic coefficient of the first spring, and $m_a$ is the first mass.

According to some embodiments, the first vibration absorber is connected to an inner surface of the first wall, the first vibration absorber includes a first block body and a first spring, and the first spring is connected between the first block body and the inner surface, wherein the first vibration absorber is disposed adjacent to the diaphragm.

According to some embodiments, the distance between the first vibration absorber and the diaphragm is less than 0.1 mm and greater than 0.

According to some embodiments, a protective wall is formed on the first wall, and the protective wall extends from the inner surface toward a second wall of the casing.

According to some embodiments, the protective wall has a second height in a second direction, the first block body has a minimum distance from the first wall in the second direction, and the second height is greater than the minimum distance, wherein the second direction is perpendicular to the first wall, and the second direction is parallel to the first direction.

According to some embodiments, the speaker module may further include a second vibration absorber. The first vibration absorber and the second vibration absorber are connected to the bottom of the magnet. The second vibration absorber has a second natural frequency. When the ratio of the frequency of the diaphragm to the second natural frequency is greater than 0.781 and less than 1.28, the second vibration absorber is configured to absorb the vibration generated by the diaphragm to the casing, wherein the first natural frequency is different from the second natural frequency.

According to some embodiments, the first vibration absorber and the second vibration absorber are symmetrical to each other relative to the center of the magnet.

According to some embodiments, the casing forms two protective walls which extend from a second wall of the casing toward the first wall, and the two protective walls are configured to respectively surround and protect the first vibration absorber and the second vibration absorber.

According to some embodiments, the second vibration absorber includes a second block body and a second spring, and the second spring is connected between the second block body and the magnet.

According to some embodiments, mass of the second block body and that of the first block body are different, and elastic coefficient of the second spring and that of the first spring are different.

According to some embodiments, the coil receives a control signal to drive the diaphragm to vibrate, the control signal is sent to the coil after being processed by a high pass filter, and the cutoff frequency of the high pass filter is less than or equal to 210 Hz.

According to some embodiments, when the ratio of the frequency of the diaphragm to the first natural frequency is greater than 0.908 and less than 1.118, the displacement ratio is less than 1.

The present disclosure provides a speaker module, including a casing, a speaker unit and a first vibration absorber. The speaker unit is disposed on the casing and has a diaphragm. When the ratio of the frequency of the diaphragm to the first natural frequency of the first vibration absorber is greater than 0.781 and less than 1.28, the first vibration absorber can effectively absorb the vibration generated by the diaphragm to the casing.

In some embodiments, the speaker module may further include a second vibration absorber, and the first vibration absorber and the second vibration absorber are connected to the bottom of the magnet of the speaker unit. When the ratio of the frequency of the diaphragm to the second natural frequency is greater than 0.781 and less than 1.28, the second vibration absorber can also effectively absorb the vibration generated by the diaphragm to the casing. Based on the configuration of two vibration absorbers, the frequency range for absorbing vibration can be increased.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
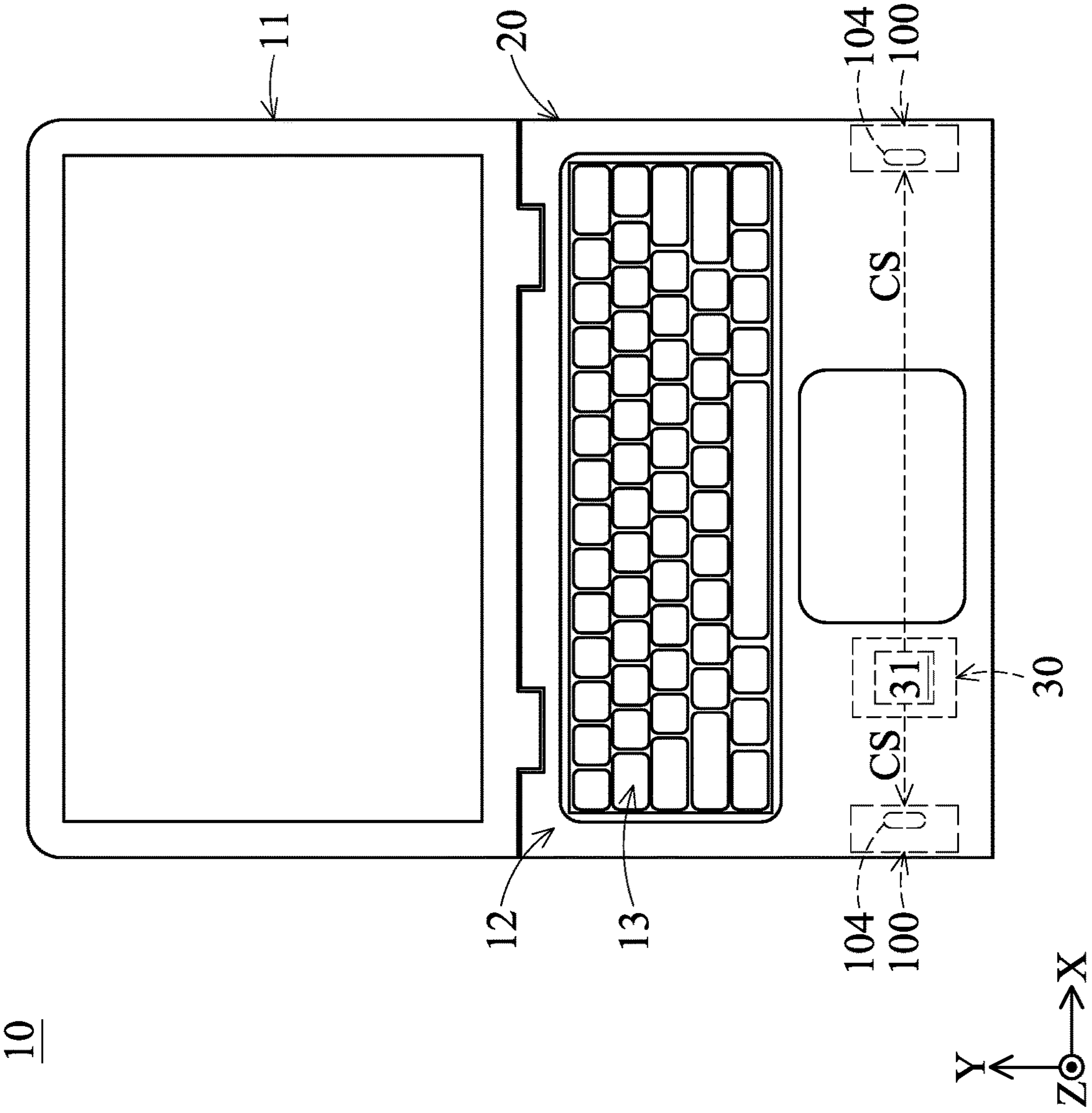
FIG. 1 is a schematic diagram of an electronic device 10 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, “vertical,” “above,” “over,” “below,”, “bottom,” etc. as well as derivatives thereof (e.g., “downwardly,” “upwardly,” etc.) are used in the present disclosure for ease of description of one feature’s relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as “first”, “second”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Please refer to FIG. 1, which is a schematic diagram of an electronic device 10 according to an embodiment of the present disclosure. The electronic device 10 is, for example, a notebook computer with a display module 11 and a host module 12. The host module 12 is connected to the display module 11, and the host module 12 may include a keyboard 13, a housing 20, an audio processing circuit 30 and two speaker modules 100.

In this embodiment, as shown in FIG. 1, the two speaker modules 100 are respectively disposed on the inner left side and the inner right side of the housing 20, but they are not limited thereto. The audio processing circuit 30 is configured to send a control signal CS to the two speaker modules 100. Furthermore, each speaker module 100 includes a speaker unit 104 configured to convert the control signal CS into an audio signal.

Figure 2:
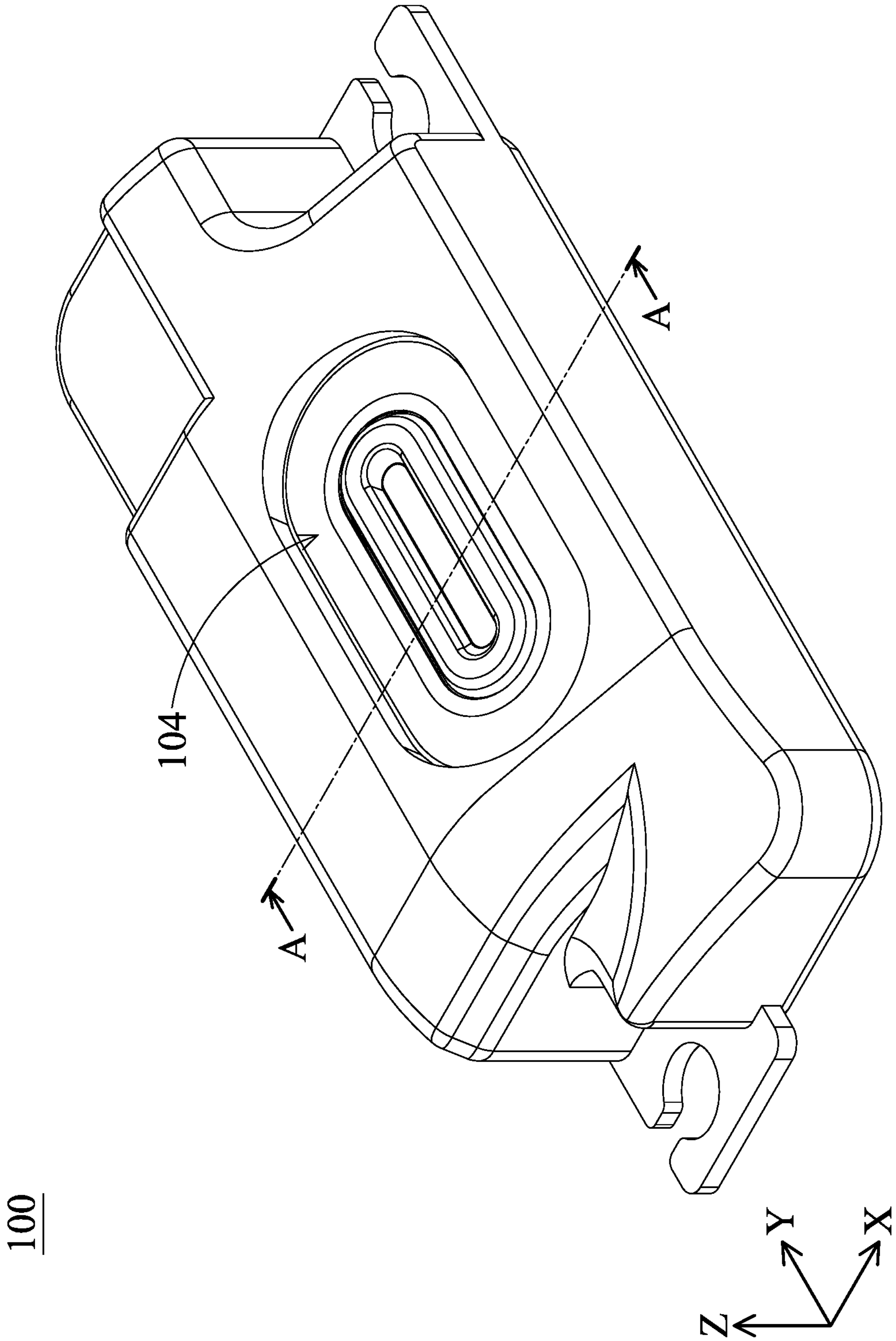
FIG. 2 is a perspective view of the speaker module 100 according to an embodiment of the present disclosure.
Figure 3:
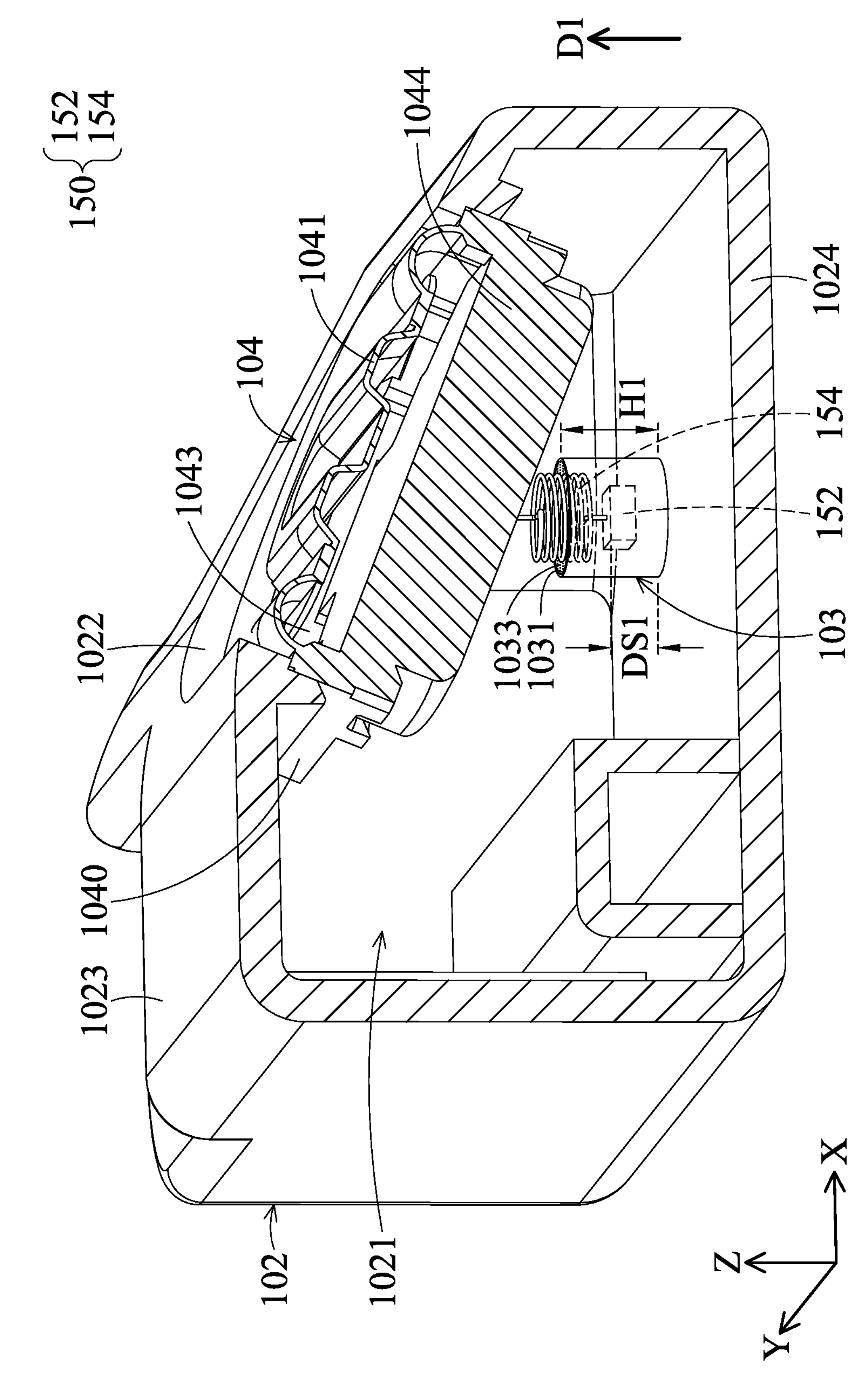
FIG. 3 is a schematic cross-sectional view of the speaker module 100 along the line A-A in FIG. 2 according to an embodiment of the present disclosure.

Next, please refer to FIG. 2 and FIG. 3. FIG. 2 is a perspective view of the speaker module 100 according to an embodiment of the present disclosure, and FIG. 3 is a schematic cross-sectional view of the speaker module 100 along the line A-A in FIG. 2 according to an embodiment of the present disclosure. In this embodiment, the speaker module 100 includes a casing 102, the aforementioned speaker unit 104 and a first vibration absorber 150.

The casing 102 may have a sound cavity 1021, a sound outlet 1022, a first wall 1023 and a second wall 1024. The sound outlet 1022 is formed on the first wall 1023, and the speaker unit 104 is disposed on the first wall 1023 of the casing 102 and communicates with the sound cavity 1021. The speaker unit 104 includes a diaphragm 1041, and the diaphragm 1041 is communicated with the sound outlet 1022.

As shown in FIG. 3, the speaker unit 104 may further include a frame 1040, a coil 1043 and a magnet 1044. The frame 1040 is affixed to the casing 102, and the magnet 1044 is fixedly disposed on the frame 1040. Furthermore, the coil 1043 is fixedly connected to the bottom of the diaphragm 1041, and the diaphragm 1041 is movably connected to the frame 1040 and suspended above the magnet 1044.

When the coil 1043 receives the control signal CS, it can act with the magnet 1044 to generate an electromagnetic driving force to drive the diaphragm 1041 to vibrate relative to the magnet 1044, so that the control signal CS is converted into an audio signal.

When the diaphragm 1041 vibrates to emits sound, it will cause the whole speaker module 100 to generate unnecessary vibration. In order to reduce the degree of vibration, in this embodiment, the first vibration absorber 150 mentioned above is used in the speaker module 100, and the first vibration absorber 150 is installed in the sound cavity 1021 to absorb unnecessary vibration.

Specifically, in this embodiment, the first vibration absorber 150 is connected to the center of the bottom of the magnet 1044, but it is not limited thereto. The first vibration absorber 150 has a first block body 152 and a first spring 154, and the first spring 154 is connected between the first block body 152 and the magnet 1044.

Furthermore, the casing 102 may form a protective wall 103 extending from the second wall 1024 of the casing 102 toward the first wall 1023, and the protective wall 103 is configured to surround and protect the first vibration absorber 150. In this embodiment, the casing 102 can be made of plastic material, and the protective wall 103 and the second wall 1024 can be integrally formed as one piece.

As shown in FIG. 3, the protective wall 103 may have a tubular structure, and a buffering member 1033 is disposed on the inner surface 1031 of the protective wall 103 and surrounds the first vibration absorber 150. The buffering member 1033 can be, for example, made of a rubber material, but it is not limited thereto.

In this embodiment, the protective wall 103 has a height H1 (the first height) in a first direction D1 (the Z-axis), the first block body 152 has a maximum distance DS1 in the first direction D1 from the second wall 1024, and the height H1 is greater than the maximum distance DS1. The first direction D1 is perpendicular to the second wall 1024.

Based on the structural design of the protective wall 103, it can ensure that when the user holds the electronic device 10 at different angles, the first block body 152 and the first spring 154 will not collide with the magnet 1044, thereby causing the problem of damage.

Figure 4:
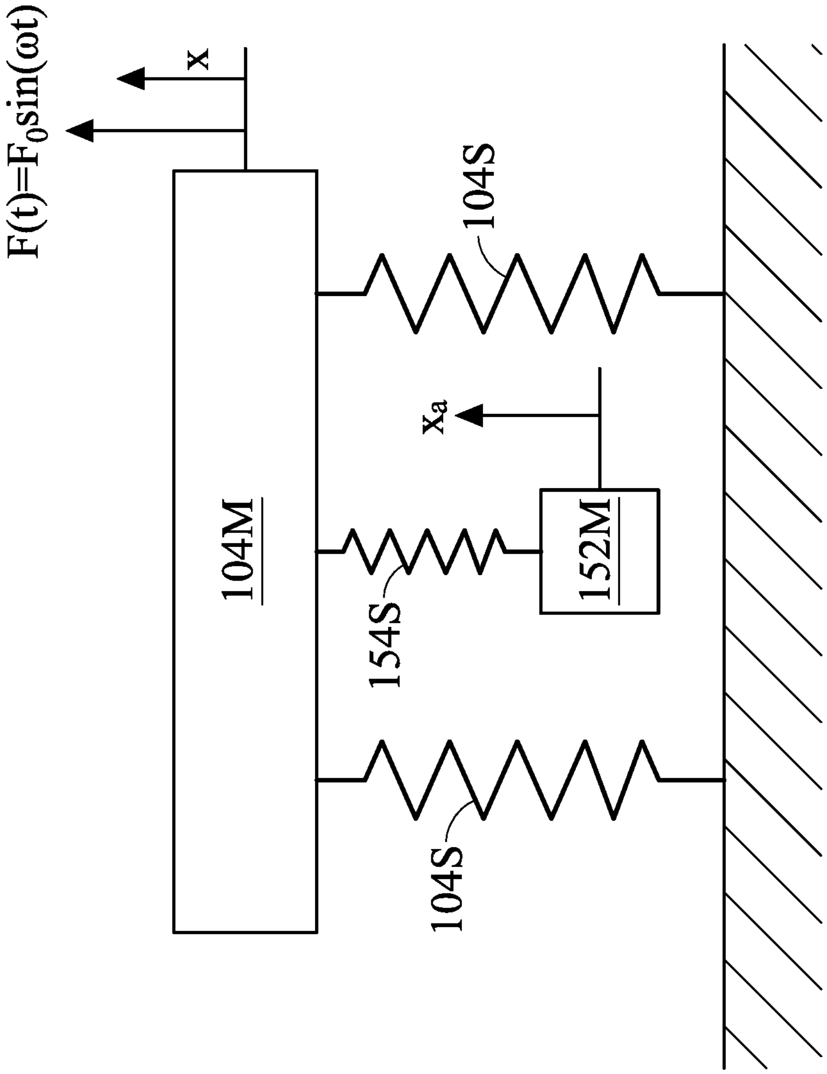
FIG. 4 is a schematic diagram of an equivalent model of the speaker module 100 according to an embodiment of the present disclosure.

Please refer to FIG. 4, which is a schematic diagram of an equivalent model of the speaker module 100 according to an embodiment of the present disclosure. A block body 104M is the equivalent mass block of the speaker unit 104, two springs 104S are equivalent springs of the speaker unit 104, a block body 152M is equivalent to the first block body 152, and a spring 154S is equivalent to the first spring 154.

Following formula (1) is an equation of motion corresponding to this equivalent model:

$$\begin{bmatrix} m & 0 \\ 0 & m_a \end{bmatrix} \begin{Bmatrix} \ddot{x} \\ \ddot{x}_a \end{Bmatrix} + \begin{bmatrix} k+k_a & -k_a \\ -k_a & k_a \end{bmatrix} \begin{Bmatrix} x \\ x_a \end{Bmatrix} = \begin{Bmatrix} F_0 \sin\omega t \\ 0 \end{Bmatrix} \tag{1}$$

wherein F0 is the force (scalar) applied to the block body 104M, m is the mass of the block body 104M, $m_a$ is the mass (the first mass) of the block body 152M, k is twice the elastic coefficient of the spring 104S, $k_a$ is the elastic coefficient (the first elastic coefficient) of the spring 154S, x is the displacement of the block body 104M in motion, $x_a$ is the displacement of the block body 152M in motion, ω is the angular frequency of the block body 104M in motion, and t is the time.

Next, please refer to the following formulas (2) and (3).

$$x = X\sin\omega t \tag{2}$$

$$x_a = X_a\sin\omega t \tag{3}$$

wherein X is the moving distance of the block body 104M, and $X_a$ is the moving distance of the block body 152M.

After the above formula (2) and formula (3) are substituted into the formula (1), the formula (4) can be derived:

$$X = \frac{(k_a - m_a\omega^2)F_0}{(k + k_a - m\omega^2)(K_a - m_a\omega^2) - k_a^2} \tag{4}$$

Then, define the formula (5) and formula (6) as follows:

$$\omega_p = \sqrt{\frac{k}{m}} \tag{5}$$

$$\omega_a = \sqrt{\frac{k_a}{m_a}} \tag{6}$$

wherein $\omega_p$ is the natural angular frequency when the block body 152M and the spring 154S are not included. That is, the natural angular frequency of the speaker module 100 after the first vibration absorber 150 is removed. Furthermore, $\omega_a$ is the natural angular frequency ($2\pi$ times the first natural frequency) when the first vibration absorber 150 is not connected to the speaker unit 104.

After formula (5) and formula (6) are substituted into formula (4), following formula (7) can be obtained:

$$\left|\frac{Xk}{F_0}\right| = \left|\frac{1-r^2}{(1+\mu\beta^2-r^2)(1-r^2)-\mu\beta^2}\right| \tag{7}$$

wherein $\mu = \frac{m_a}{m}$, $\beta = \frac{\omega_a}{\omega_p}$, $r = \frac{\omega}{\omega_a}$ (the frequency ratio).

Figure 5:
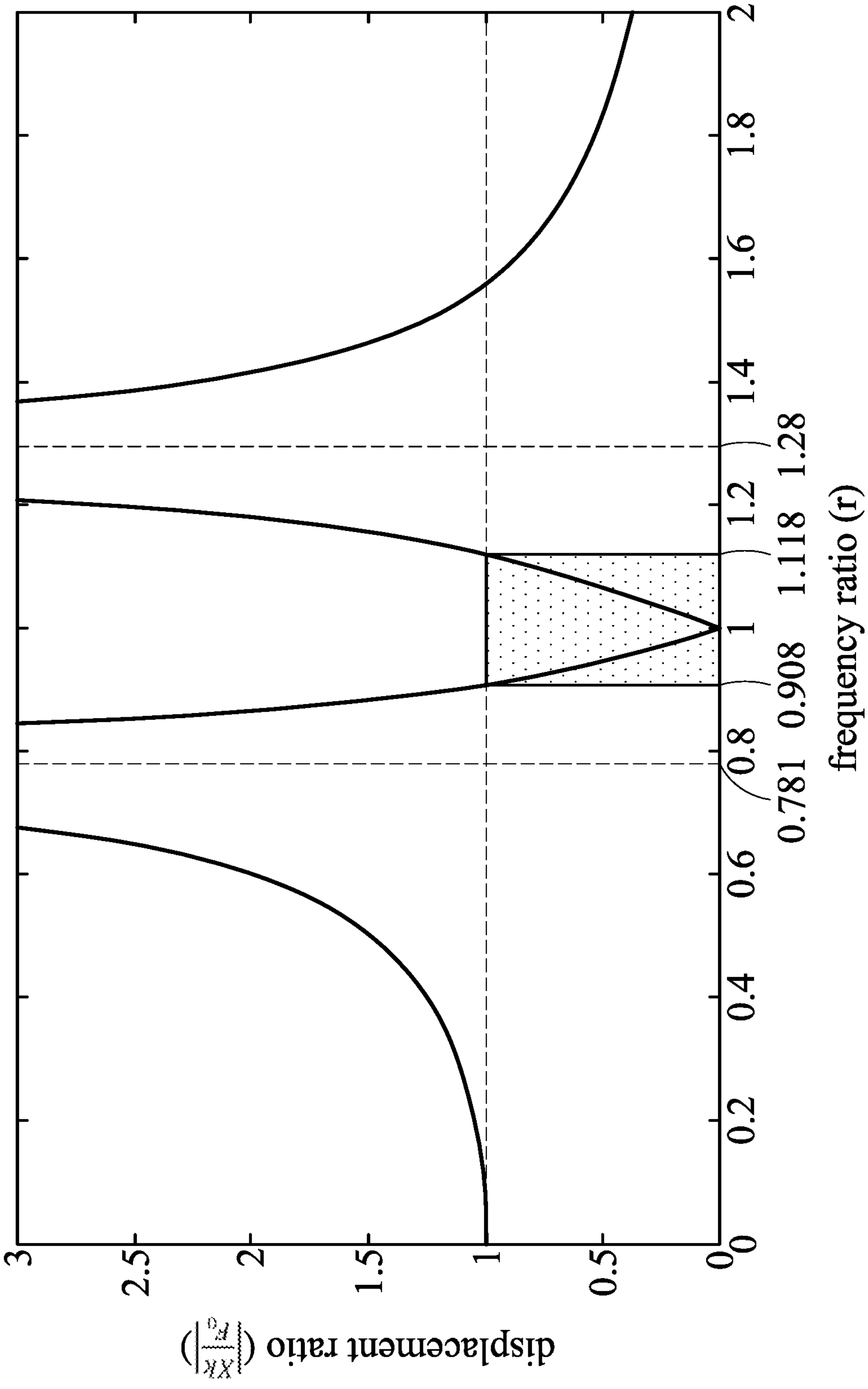
FIG. 5 is a chart illustrating the relationship between displacement ratio and frequency ratio according to an embodiment of the disclosure.

Thus, FIG. 5 can be drawn according to the formula (7). Please refer to FIG. 5 and FIG. 6. FIG. 5 is a chart illustrating the relationship between displacement ratio and frequency ratio according to an embodiment of the disclosure, and FIG. 6 is a chart illustrating the relationship between the vibration displacement and frequency of the speaker module 100 according to an embodiment of the present disclosure.

In FIG. 5, when the frequency ratio r is between 0.781 and 1.28, the displacement ratio can be effectively reduced. That is, when the ratio of the vibration frequency of the diaphragm 1041 (that is, $\omega/2\pi$ in the aforementioned formula) to the first natural frequency ($\omega_a/2\pi$) is greater than 0.781 and less than 1.118, the first vibration absorber 150 is configured to absorb the vibration generated by the diaphragm 1041 to the casing 102.

Preferably, as shown in FIG. 5, when the ratio of the frequency of the diaphragm 1041 to the first natural frequency is greater than 0.908 and less than 1.118, the displacement ratio can be less than 1. That is, within this range, the vibration generated by the diaphragm 1041 can be more effectively suppressed.

Figure 6:
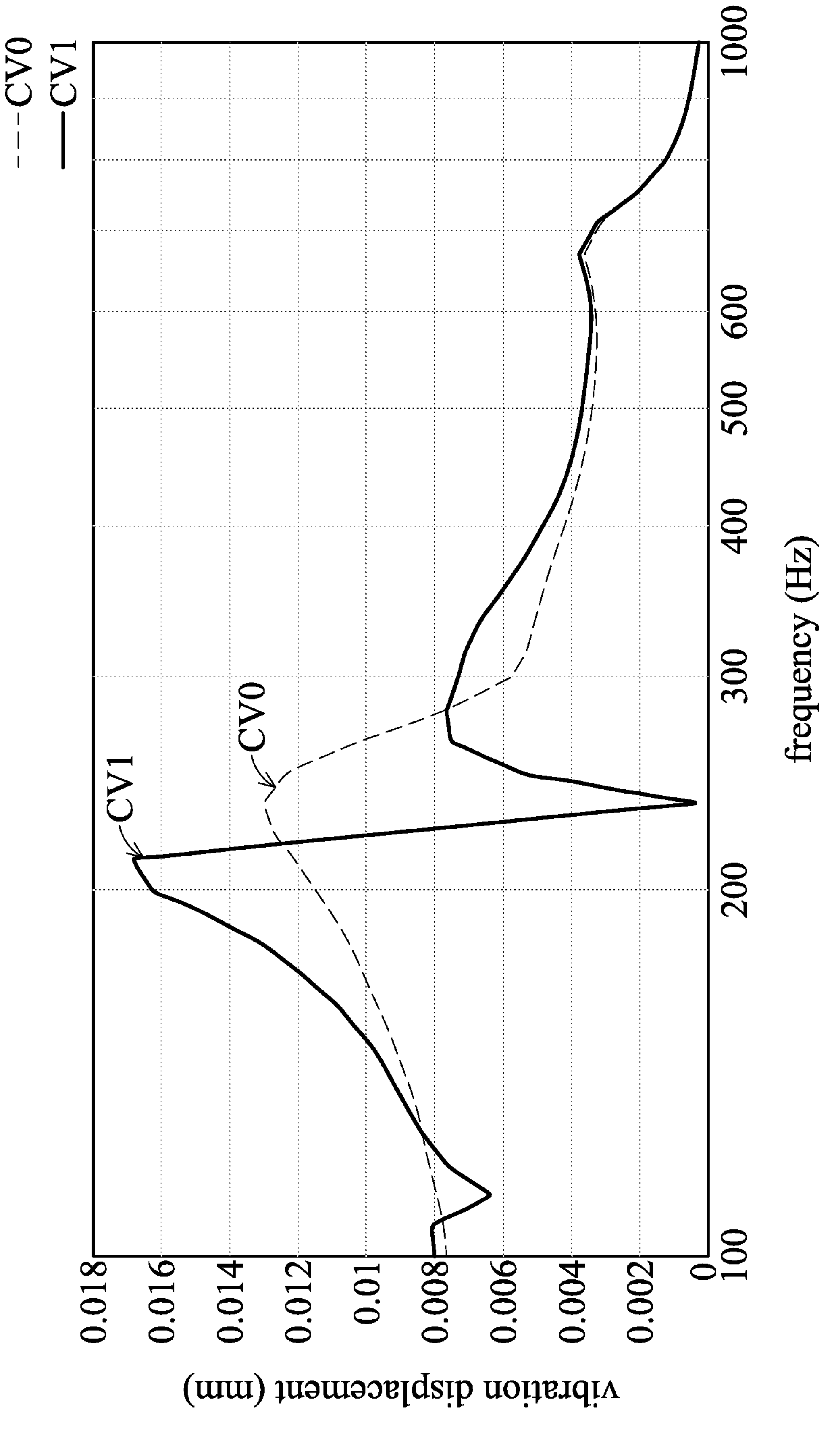
FIG. 6 is a chart illustrating the relationship between the vibration displacement and frequency of the speaker module 100 according to an embodiment of the present disclosure.

In FIG. 6, the curve CV0 represents the relationship curve between the frequency and the vibration displacement of the speaker module 100 without adding the first vibration absorber 150, and the curve CV1 represents the relationship curve between the frequency and the vibration displacement of the speaker module 100 after the first vibration absorber 150 is added.

As shown in FIG. 6, between 210 Hz and 300 Hz, the vibration displacement generated by the speaker module 100 (FIG. 3) along the Z-axis can be effectively reduced. In this embodiment, when the frequency is 236 Hz, the vibration displacement generated by the speaker module 100 along the Z-axis can be minimized, but the frequency is not limited thereto.

It should be noted that in this present disclosure, the audio processing circuit 30 in FIG. 1 may further include a high pass filter 31, and the control signal CS is sent to the coil 1043 after being processed by the high pass filter 31. The cutoff frequency of the high pass filter 31 is less than or equal to 210 Hz, such as 200 Hz, but it is not limited thereto.

Based on such a design, the vibration displacement generated below 210 Hz in FIG. 6 can be effectively removed. Because the sound below 200 Hz is inaudible to the human ear, the sound quality output by the speaker module 100 will not be affected.

It should be noted that, in this embodiment, the first block body 152 can be made of iron, copper and other materials, and the first mass of the first block body 152 is less than 2 grams. For example, the first mass may be 1 gram, but it is not limited thereto. Furthermore, the first elastic coefficient of the first spring 154 may be, for example, 3243.8 (N/m), but it is not limited thereto.

Furthermore, the first vibration absorber 150 is in accordance with the following relational expression (8):

$$f = \frac{1}{2\pi}\sqrt{\frac{k_a}{m_a}} \tag{8}$$

wherein f is the frequency when the diaphragm 1041 vibrates.

That is, the frequency (for example, 210 Hz) corresponding to the minimum vibration displacement in FIG. 6 can be selected according to the above relational expression (8) to determine the first mass and the first elastic coefficient. That is to say, it can be determined according to the speaker module of different embodiments, so as to achieve the best effect of reducing vibration.

Figure 7:
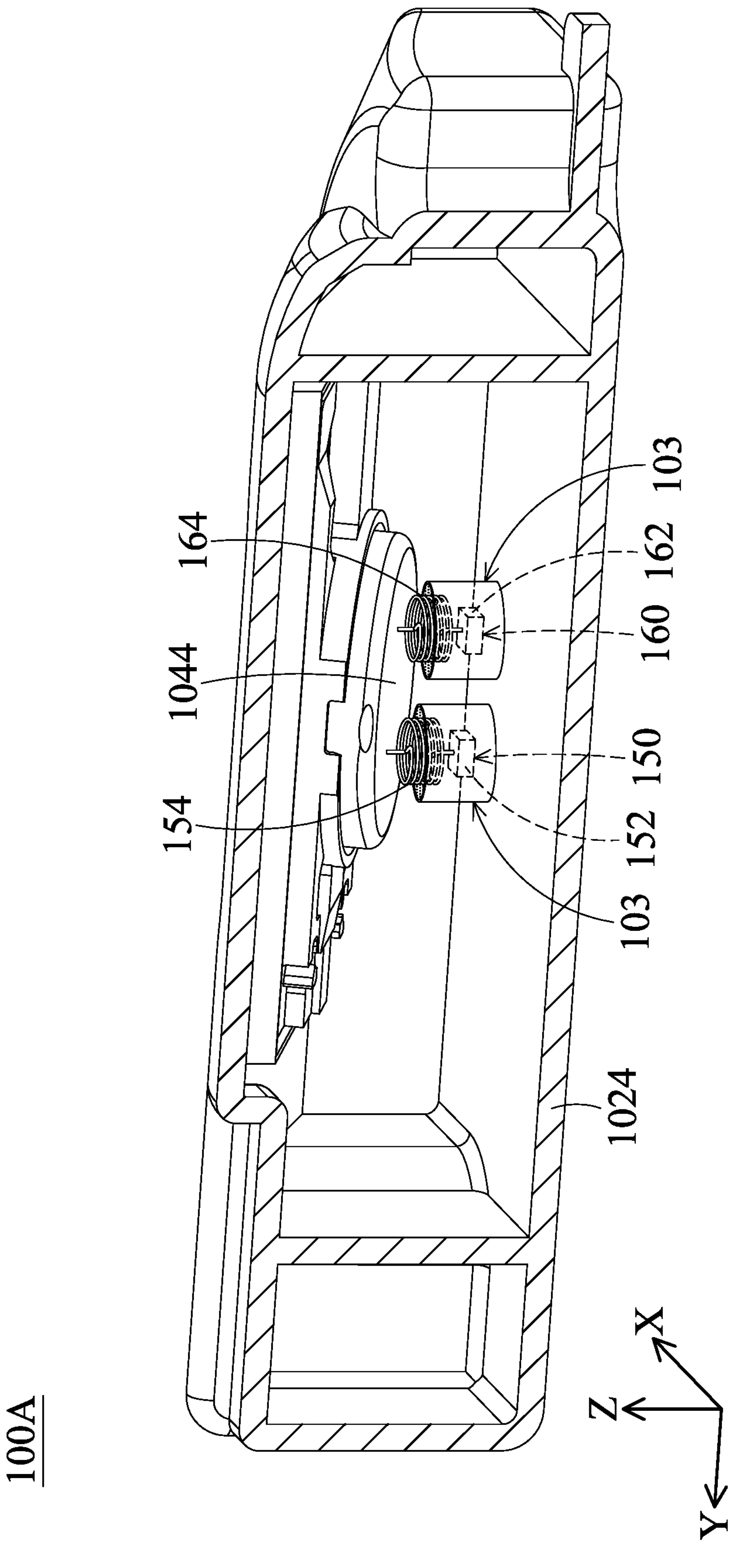
FIG. 7 is a three-dimensional cross-sectional view of the speaker module 100A according to another embodiment of the present disclosure.
Figure 8:
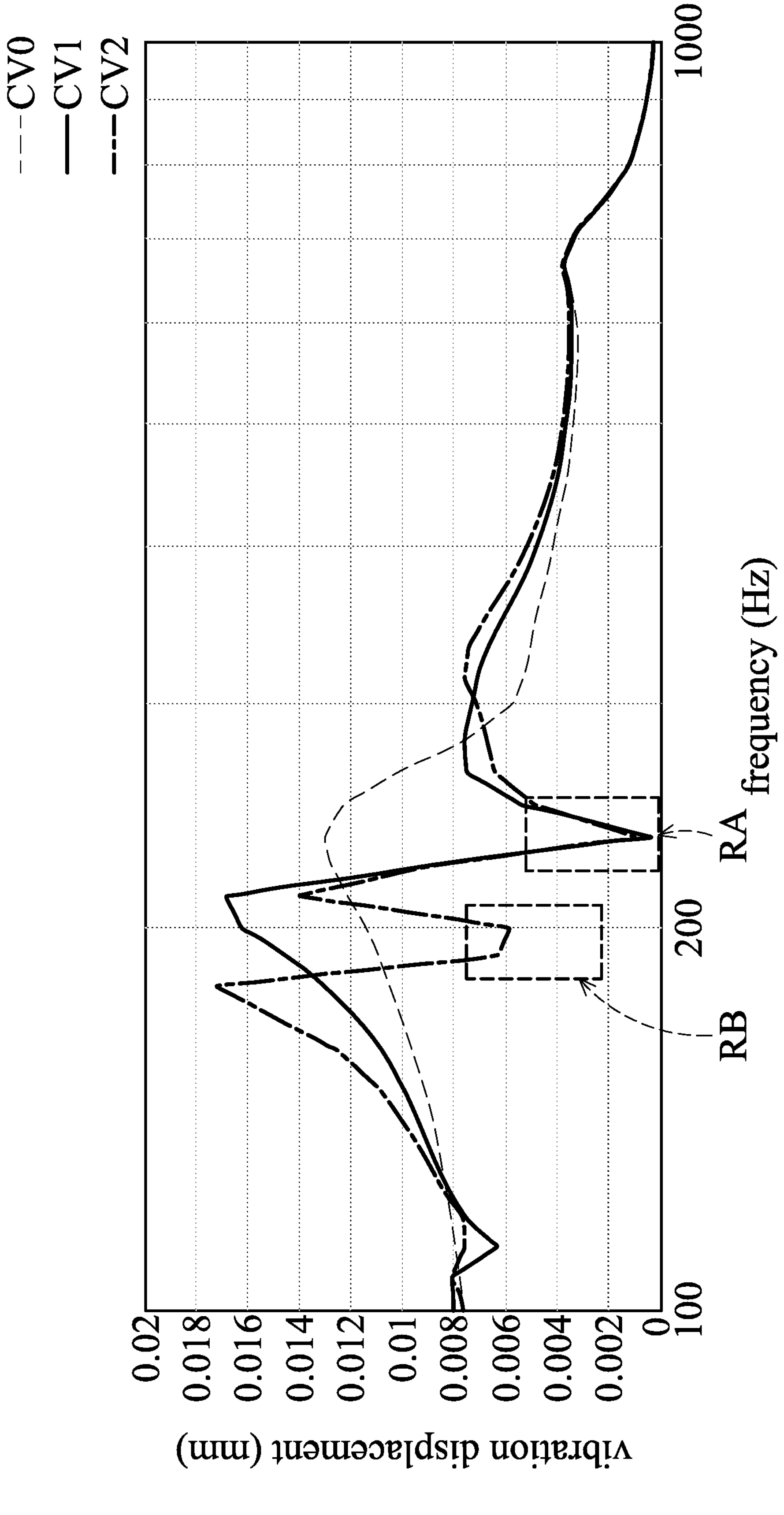
FIG. 8 is a chart illustrating the relationship between vibration displacement and frequency of the speaker module 100A according to another embodiment of the present disclosure.

Next, please refer to FIG. 7 and FIG. 8. FIG. 7 is a three-dimensional cross-sectional view of the speaker module 100A according to another embodiment of the present disclosure, and FIG. 8 is a chart illustrating the relationship between vibration displacement and frequency of the speaker module 100A according to another embodiment of the present disclosure. In this embodiment, the speaker module 100A may further include a second vibration absorber 160, and the first vibration absorber 150 and the second vibration absorber 160 are connected to the bottom of the magnet 1044.

In this embodiment, the first vibration absorber 150 and the second vibration absorber 160 are symmetrical to each other relative to the center of the magnet 1044, but it is not limited thereto. The second vibration absorber 160 includes a second block body 162 and a second spring 164, and the second spring 164 is connected between the second block body 162 and the magnet 1044.

In this embodiment, the mass of the second block body 162 and the first block body 152 may be different, and the elastic coefficients of the second spring 164 and the first spring 154 may be different, but they are not limited thereto.

In addition, similar to the previous embodiments, in this embodiment, two protective walls 103 can be formed on the second wall 1024 to respectively surround and protect the first vibration absorber 150 and the second vibration absorber 160.

Moreover, similar to the first vibration absorber 150, the second vibration absorber 160 has a second natural frequency, and when the ratio of the frequency of the diaphragm 1041 vibrating to the second natural frequency is greater than 0.781 and less than 1.28, the second vibration absorber 160 is configured to absorb the vibration generated by the diaphragm 1041 to the casing 102. Preferably, when the ratio of the frequency of the diaphragm 1041 vibrating to the second natural frequency is greater than 0.908 and less than 1.118, the vibration generated by the diaphragm 1041 can be more effectively suppressed.

It should be noted that the first natural frequency is different from the second natural frequency. In this embodiment, the first natural frequency is 250 Hz, and the second natural frequency is 200 Hz, but they are not limited thereto.

In FIG. 8, the curve CV2 represents the relationship between the frequency and the vibration displacement of the speaker module 100A. Compared with the curve CV1, the vibration displacement of the curve CV2 between 70 Hz and 210 Hz can be effectively reduced. That is, the configuration of this embodiment can increase the frequency range in which the vibration is absorbed. In FIG. 8, a region RA corresponds to the first vibration absorber 150, and a region RB corresponds to the second vibration absorber 160.

Figure 9:
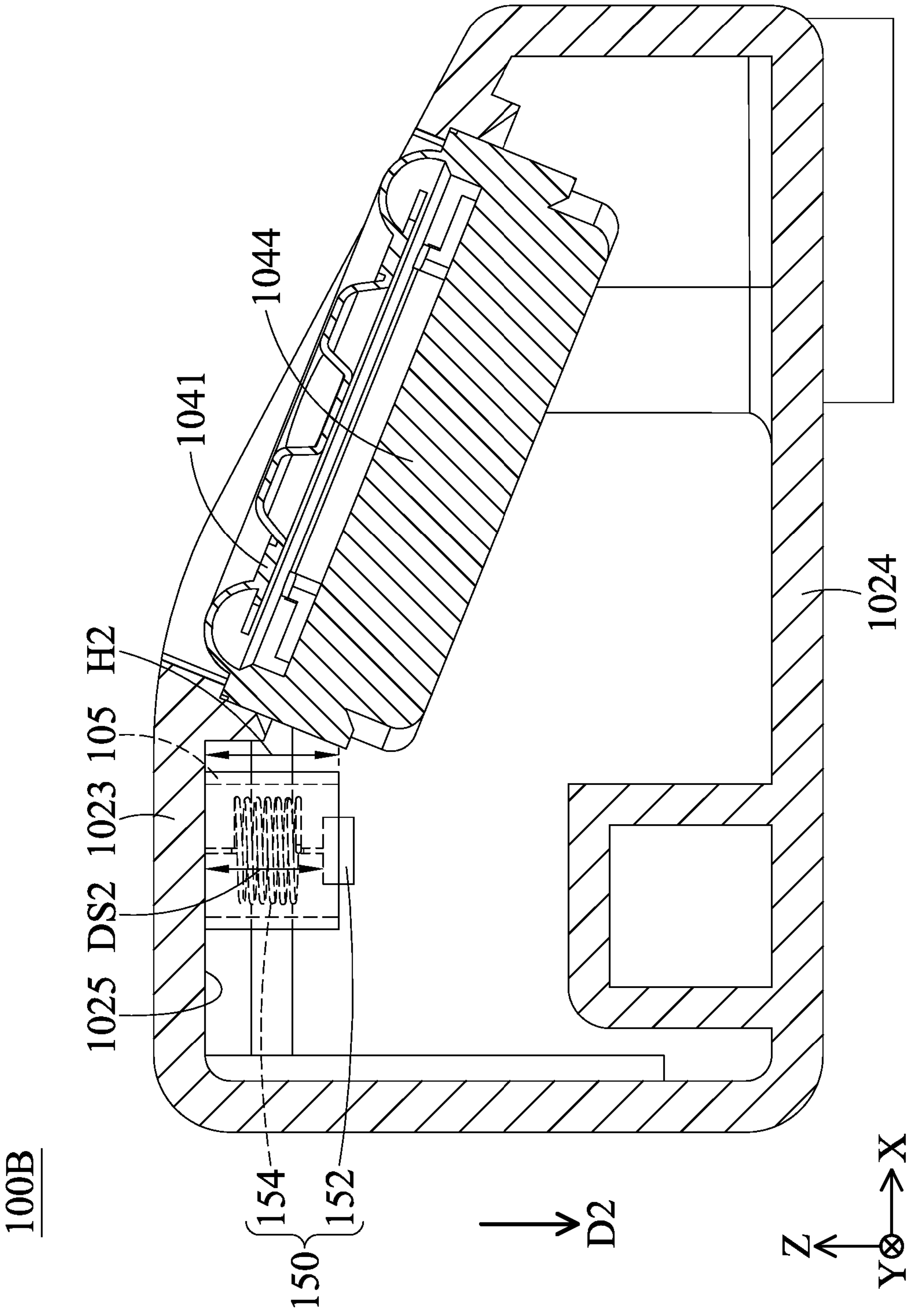
FIG. 9 is a three-dimensional cross-sectional view of a speaker module 100B according to another embodiment of the present disclosure.
Figure 10:
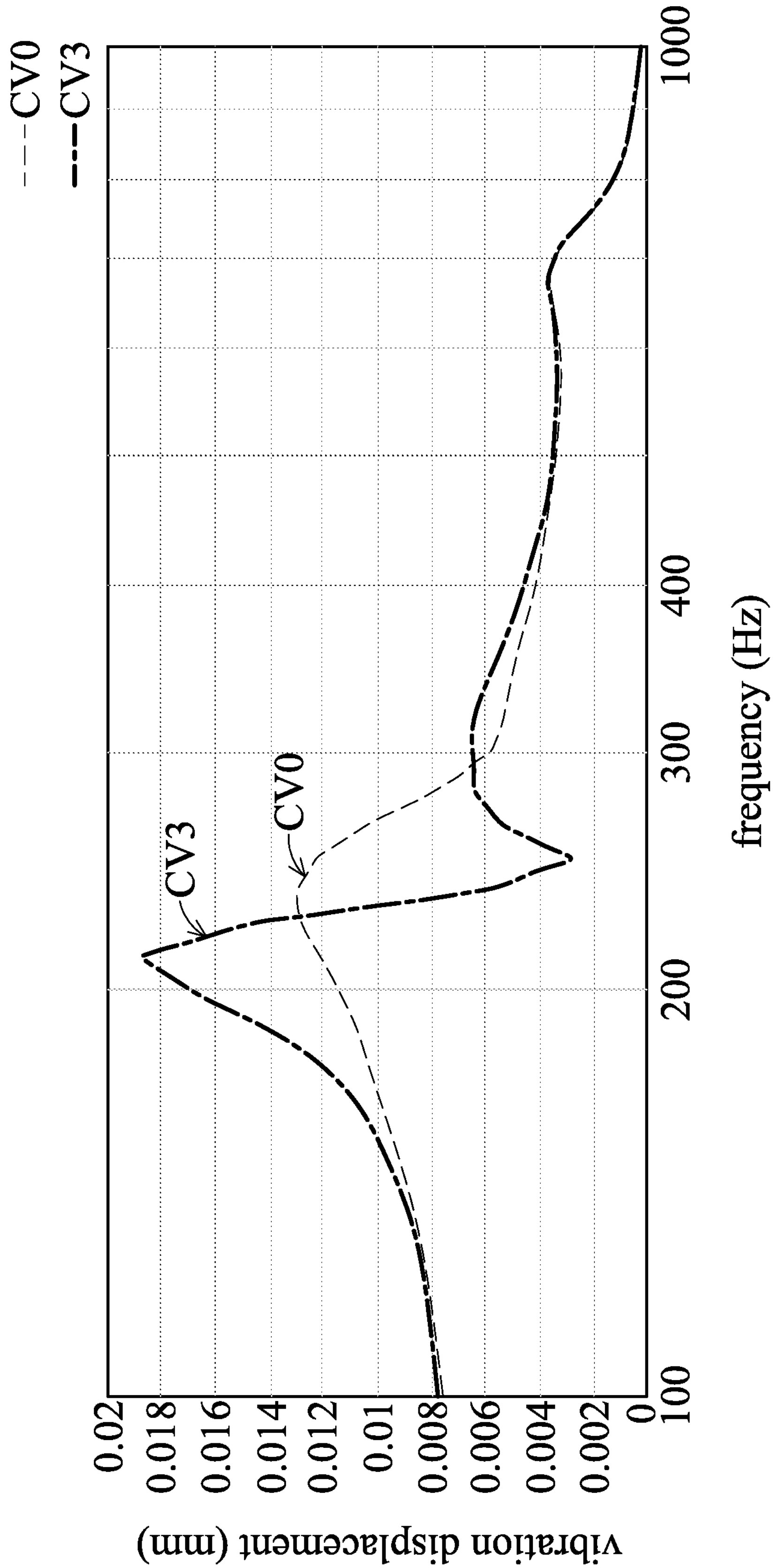
FIG. 10 is a chart illustrating the relationship between vibration displacement and frequency of the speaker module 100B according to another embodiment of the present disclosure.

Please refer to FIG. 9 and FIG. 10. FIG. 9 is a three-dimensional cross-sectional view of a speaker module 100B according to another embodiment of the present disclosure, and FIG. 10 is a chart illustrating the relationship between vibration displacement and frequency of the speaker module 100B according to another embodiment of the present disclosure. In this embodiment, the first vibration absorber 150 is connected to an inner surface 1025 of the first wall 1023.

That is, the first spring 154 is connected between the first block body 152 and the inner surface 1025. It should be noted that the first vibration absorber 150 is disposed adjacent to the diaphragm 1041. For example, the distance between the first vibration absorber 150 and the diaphragm 1041 along the X-axis may be less than 0.1 mm and greater than 0, but it is not limited thereto.

Similarly, as shown in FIG. 9, a protective wall 105 can be formed on the first wall 1023, and the protective wall 105 extends from the inner surface 1025 toward the second wall 1024. The protective wall 105 has a height H2 (the second height) in a second direction D2 (the Z-axis), the first block body 152 has a minimum distance DS2 from the first wall 1023 in the second direction D2, and the height H2 is greater than the minimum distance DS2. The second direction D2 is perpendicular to the first wall 1023, and the second direction D2 is parallel to the first direction D1.

In FIG. 10, the curve CV3 represents the relationship between the frequency and the vibration displacement of the speaker module 100B. As shown in FIG. 10, similar to the speaker module 100, the vibration displacement generated by the speaker module 100B along the Z-axis can be effectively reduced between 210 Hz and 300 Hz.

Figure 11:
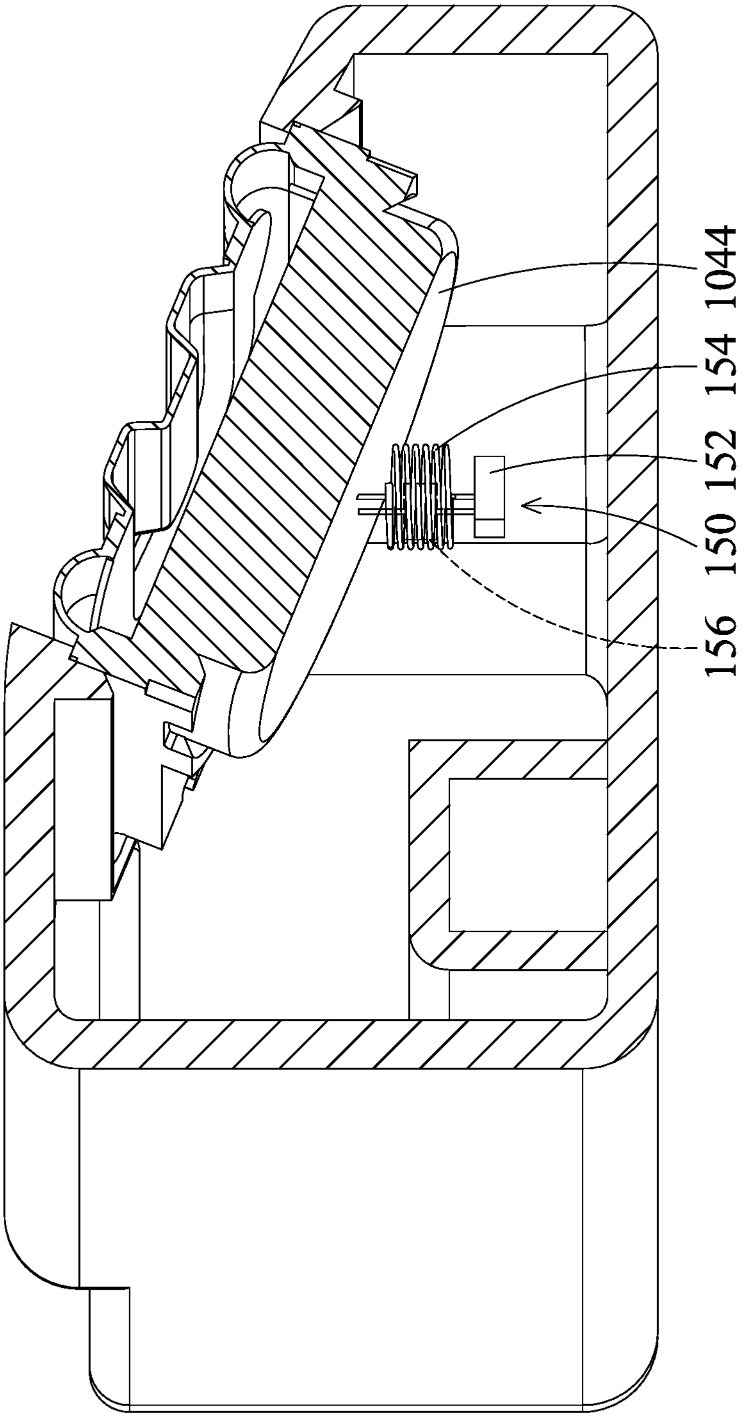
FIG. 11 is a three-dimensional cross-sectional view of a speaker module 100C according to another embodiment of the present disclosure.
Figure 12:
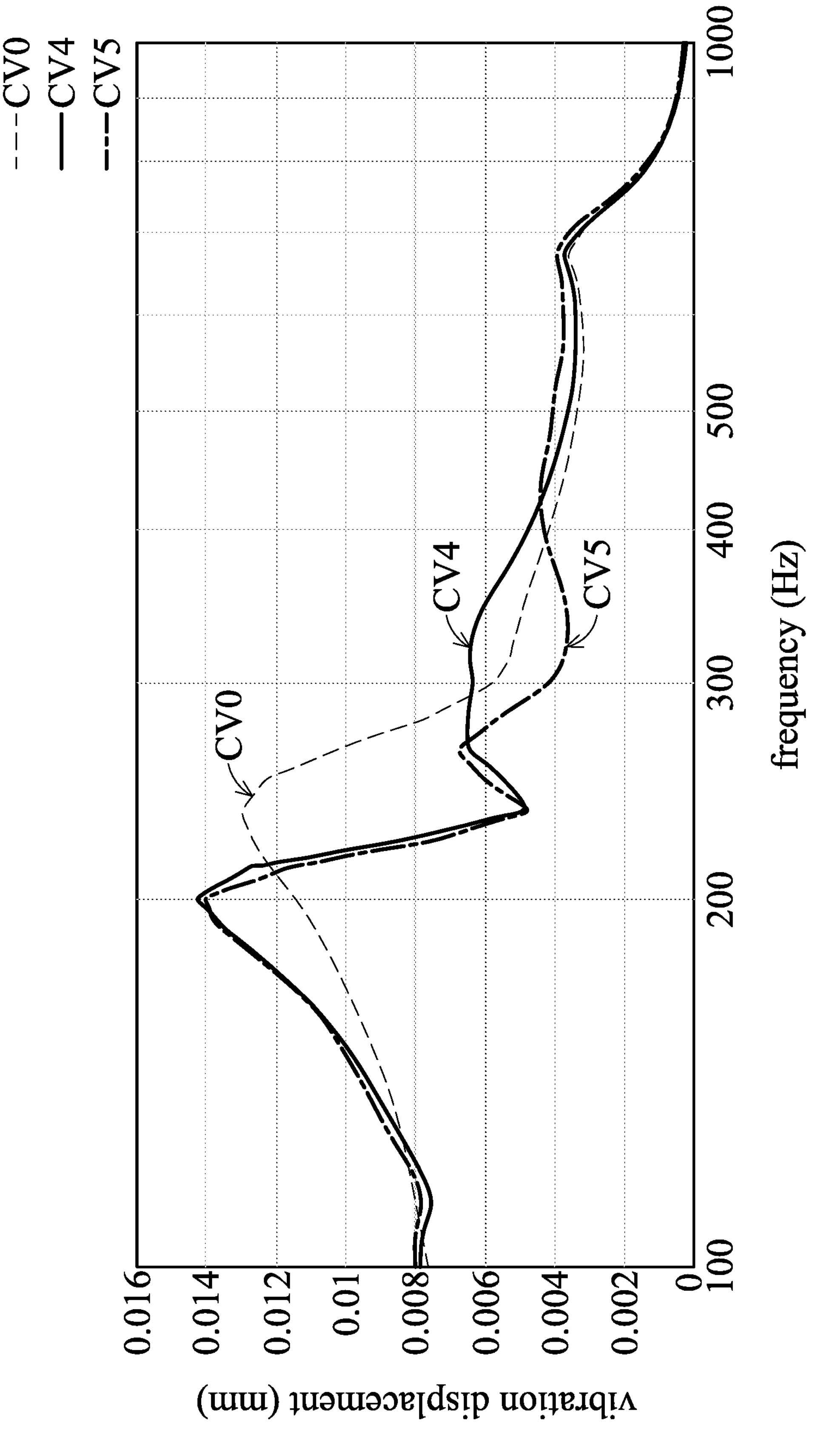
FIG. 12 is a chart illustrating the relationship between vibration displacement and frequency of the speaker module 100C according to another embodiment of the present disclosure.

Please refer to FIG. 11 and FIG. 12. FIG. 11 is a three-dimensional cross-sectional view of a speaker module 100C according to another embodiment of the present disclosure, and FIG. 12 is a chart illustrating the relationship between vibration displacement and frequency of the speaker module 100C according to another embodiment of the present disclosure. In this embodiment, the first vibration absorber 150 may further have a first damping element 156 connected between the first block body 152 and the magnet 1044.

In this embodiment, the damping coefficient of the first damping element 156 is, for example, 0.1, but it is not limited thereto. For example, the damping coefficient of the first damping element 156 can also be 0.5. In addition, it should be noted that, in some embodiments, the first damping element 156 and the first spring 154 can be integrally formed as one piece.

In FIG. 12, the curve CV4 represents the relationship between vibration displacement and frequency when the damping coefficient is 0.1, and curve CV5 represents the relationship between vibration displacement and frequency of speaker module 100C when the damping coefficient is 0.5. Based on the setting of the first damping element 156, as shown in FIG. 12, in the frequency range of 200 Hz to 400 Hz, the speaker module 100C can further reduce the vibration displacement generated along the Z-axis.

In conclusion, the present disclosure provides a speaker module, including a casing 102, a speaker unit 104 and a first vibration absorber 150. The speaker unit 104 is disposed on the casing 102 and has a diaphragm 1041. When the ratio of the frequency of the diaphragm 1041 to the first natural frequency of the first vibration absorber 150 is greater than 0.781 and less than 1.28, the first vibration absorber 150 can effectively absorb the vibration generated by the diaphragm 1041 to the casing 102.

In some embodiments, the speaker module may further include a second vibration absorber 160, and the first vibration absorber 150 and the second vibration absorber 160 are connected to the bottom of the magnet 1044 of the speaker unit 104. When the ratio of the frequency of the diaphragm 1041 to the second natural frequency is greater than 0.781 and less than 1.28, the second vibration absorber 160 can also effectively absorb the vibration generated by the diaphragm 1041 to the casing 102. Based on the configuration of two vibration absorbers, the frequency range for absorbing vibration can be increased.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A speaker module, comprising:

a casing, having a sound cavity;

a speaker unit, disposed on a first wall of the casing, wherein the speaker unit includes a diaphragm, a coil and a magnet, and the coil is configured to drive the diaphragm to vibrate relative to the magnet; and a first vibration absorber, disposed in the sound cavity, wherein the first vibration absorber has a first natural frequency;

wherein when the ratio of the frequency of the diaphragm to the first natural frequency is greater than 0.781 and less than 1.28, the first vibration absorber is configured to absorb the vibration generated by the diaphragm to the casing;

wherein the first vibration absorber is connected to a center of a bottom of the magnet, the first vibration absorber has a first block body and a first spring, and the first spring is connected between the first block body and the magnet;

wherein the casing forms a protective wall which extends from a second wall of the casing toward the first wall, and the protective wall is configured to surround and protect the first vibration absorber.

2. The speaker module as claimed in claim 1, wherein the first vibration absorber further has a first damping element connected between the first block body and the magnet, and the first damping element and the first spring are integrally formed as one piece.

3. The speaker module as claimed in claim 1, wherein the casing is made of plastic material, and the protective wall and the second wall are integrally formed as one piece.

4. The speaker module as claimed in claim 1, wherein the protective wall has a tubular structure, and a buffering member is disposed on an inner surface of the protective wall and surrounds the first vibration absorber.

5. The speaker module as claimed in claim 4, wherein the buffering member is made of a rubber material.

6. The speaker module as claimed in claim 1, wherein the protective wall has a first height in a first direction, the first block body has a maximum distance from the second wall in the first direction, and the first height is greater than the maximum distance, wherein the first direction is perpendicular to the second wall.

7. The speaker module as claimed in claim 1, wherein the first block body is made of iron or copper and a first mass of the first block body is less than 2 grams and is in accordance with the following relational expression:

$$f = \frac{1}{2\pi}\sqrt{\frac{k_a}{m_a}},$$

wherein f is the frequency when the diaphragm vibrates, ka is a first elastic coefficient of the first spring, and ma is the first mass.

8. The speaker module as claimed in claim 1, wherein the speaker module may further include a second vibration absorber, the first vibration absorber and the second vibration absorber are connected to a bottom of the magnet, the second vibration absorber has a second natural frequency, and when the ratio of the frequency of the diaphragm to the second natural frequency is greater than 0.781 and less than 1.28, the second vibration absorber is configured to absorb the vibration generated by the diaphragm to the casing, wherein the first natural frequency is different from the second natural frequency.

9. The speaker module as claimed in claim 8, wherein the first vibration absorber and the second vibration absorber are symmetrical to each other relative to a center of the magnet.

10. The speaker module as claimed in claim 8, wherein the casing forms two protective walls which extend from a second wall of the casing toward the first wall, and the two protective walls are configured to respectively surround and protect the first vibration absorber and the second vibration absorber.

11. The speaker module as claimed in claim 8, wherein the second vibration absorber includes a second block body and a second spring, and the second spring is connected between the second block body and the magnet.

12. The speaker module as claimed in claim 11, wherein mass of the second block body and that of the first block body are different, and elastic coefficient of the second spring and that of the first spring are different.

13. The speaker module as claimed in claim 1, wherein the coil receives a control signal to drive the diaphragm to vibrate, the control signal is sent to the coil after being processed by a high pass filter, and the cutoff frequency of the high pass filter is less than or equal to 210 Hz.

14. The speaker module as claimed in claim 1, wherein when the ratio of the frequency of the diaphragm to the first natural frequency is greater than 0.908 and less than 1.118, a displacement ratio is less than 1.

15. A speaker module, comprising:

a casing, having a sound cavity;

a speaker unit, disposed on a first wall of the casing, wherein the speaker unit includes a diaphragm, a coil and a magnet, and the coil is configured to drive the diaphragm to vibrate relative to the magnet; and a first vibration absorber, disposed in the sound cavity, wherein the first vibration absorber has a first natural frequency;

wherein when the ratio of the frequency of the diaphragm to the first natural frequency is greater than 0.781 and less than 1.28, the first vibration absorber is configured to absorb the vibration generated by the diaphragm to the casing;

wherein the first vibration absorber is connected to an inner surface of the first wall, the first vibration absorber includes a first block body and a first spring, and the first spring is connected between the first block body and the inner surface, wherein the first vibration absorber is disposed adjacent to the diaphragm.

16. The speaker module as claimed in claim 15, wherein a distance between the first vibration absorber and the diaphragm is less than 0.1 mm and greater than 0.

17. The speaker module as claimed in claim 15, wherein a protective wall is formed on the first wall, and the protective wall extends from the inner surface toward a second wall of the casing.

18. The speaker module as claimed in claim 17, wherein the protective wall has a second height in a second direction, the first block body has a minimum distance from the first wall in the second direction, and the second height is greater than the minimum distance, wherein the second direction is perpendicular to the first wall, and the second direction is parallel to the first direction.

* * * * *